US007775343B2

(12) United States Patent
Kemph et al.

(10) Patent No.: US 7,775,343 B2
(45) Date of Patent: Aug. 17, 2010

(54) MANUFACTURING DEVICE FOR USE WITH A VIBRATORY CONVEYOR, AND METHOD FOR MANUFACTURING A PRODUCT

(75) Inventors: Quentin Kemph, Walla Walla, WA (US); Eric Mason, Walla Walla, WA (US); Ken Carambot, Milton Freewater, OR (US); Teri Johnson, Athena, OR (US); Phil Hoffman, Walla Walla, WA (US); Brian Howton, Walla Walla, WA (US)

(73) Assignee: Key Technology, Inc., Walla Walla, WA (US)

( * ) Notice: Subject to any disclaimer, the term of this patent is extended or adjusted under 35 U.S.C. 154(b) by 679 days.

(21) Appl. No.: 11/712,622

(22) Filed: Mar. 1, 2007

(65) Prior Publication Data

US 2008/0210525 A1     Sep. 4, 2008

(51) Int. Cl.
*B65G 27/00* (2006.01)
(52) U.S. Cl. ..................................... 198/754
(58) Field of Classification Search .............. 198/752.1, 198/754, 760, 771, 812, 836.1, 860.3, 860.5
See application file for complete search history.

(56) References Cited

U.S. PATENT DOCUMENTS

| 458,571 | A |   | 9/1891 | Gedge |   |
|---|---|---|---|---|---|
| 3,087,602 | A | * | 4/1963 | Hinkle, Jr. | 198/759 |
| 3,228,517 | A | * | 1/1966 | Yeasting | 198/759 |
| 4,313,535 | A |   | 2/1982 | Carmichael |   |
| 4,482,046 | A | * | 11/1984 | Kraus | 198/771 |
| 4,700,827 | A | * | 10/1987 | Haaser | 198/771 |
| 4,787,502 | A | * | 11/1988 | Sullivan et al. | 198/771 |
| 4,821,782 | A | * | 4/1989 | Hyer | 141/83 |
| 5,146,758 | A |   | 9/1992 | Herman |   |
| 5,375,694 | A | * | 12/1994 | Sanford et al. | 198/771 |
| 5,423,411 | A |   | 6/1995 | Kennett |   |
| 5,494,151 | A | * | 2/1996 | Kondo et al. | 198/757 |
| 5,511,566 | A | * | 4/1996 | Brand | 131/109.3 |
| 6,079,549 | A |   | 6/2000 | Meitinger |   |
| 6,116,409 | A |   | 9/2000 | Yokajty et al. |   |
| 6,276,518 | B1 |   | 8/2001 | Wierman |   |
| 6,295,684 | B1 |   | 10/2001 | Skinner |   |
| 6,460,680 | B1 |   | 10/2002 | Hufford |   |
| 6,827,787 | B2 |   | 12/2004 | Yonezawa et al. |   |
| 6,843,260 | B2 |   | 1/2005 | Trahan |   |
| 6,868,960 | B2 |   | 3/2005 | Jones |   |
| 6,991,092 | B2 | * | 1/2006 | Chojnacki | 198/779 |
| 7,422,894 | B2 | * | 9/2008 | Tratt et al. | 435/290.3 |
| 7,571,800 | B2 | * | 8/2009 | Hart et al. | 198/766 |
| 2005/0281923 | A1 |   | 12/2005 | Kubat et al. |   |

FOREIGN PATENT DOCUMENTS

WO    PCT/US08/02574    9/2009

\* cited by examiner

*Primary Examiner*—Douglas A Hess
(74) *Attorney, Agent, or Firm*—Wells St. John PS.

(57) ABSTRACT

A manufacturing device for use with a vibratory conveyor having a product transporting bed, and a method for manufacturing a product is described and which includes a flexible substrate having a first upper course, and a second lower course which rests upon a product transporting bed of a vibratory conveyor, and wherein a product which is being manufactured and transported by the vibratory conveyor travels between the upper and lower courses of the flexible substrate as the product moves along the vibratory conveyor.

17 Claims, 8 Drawing Sheets

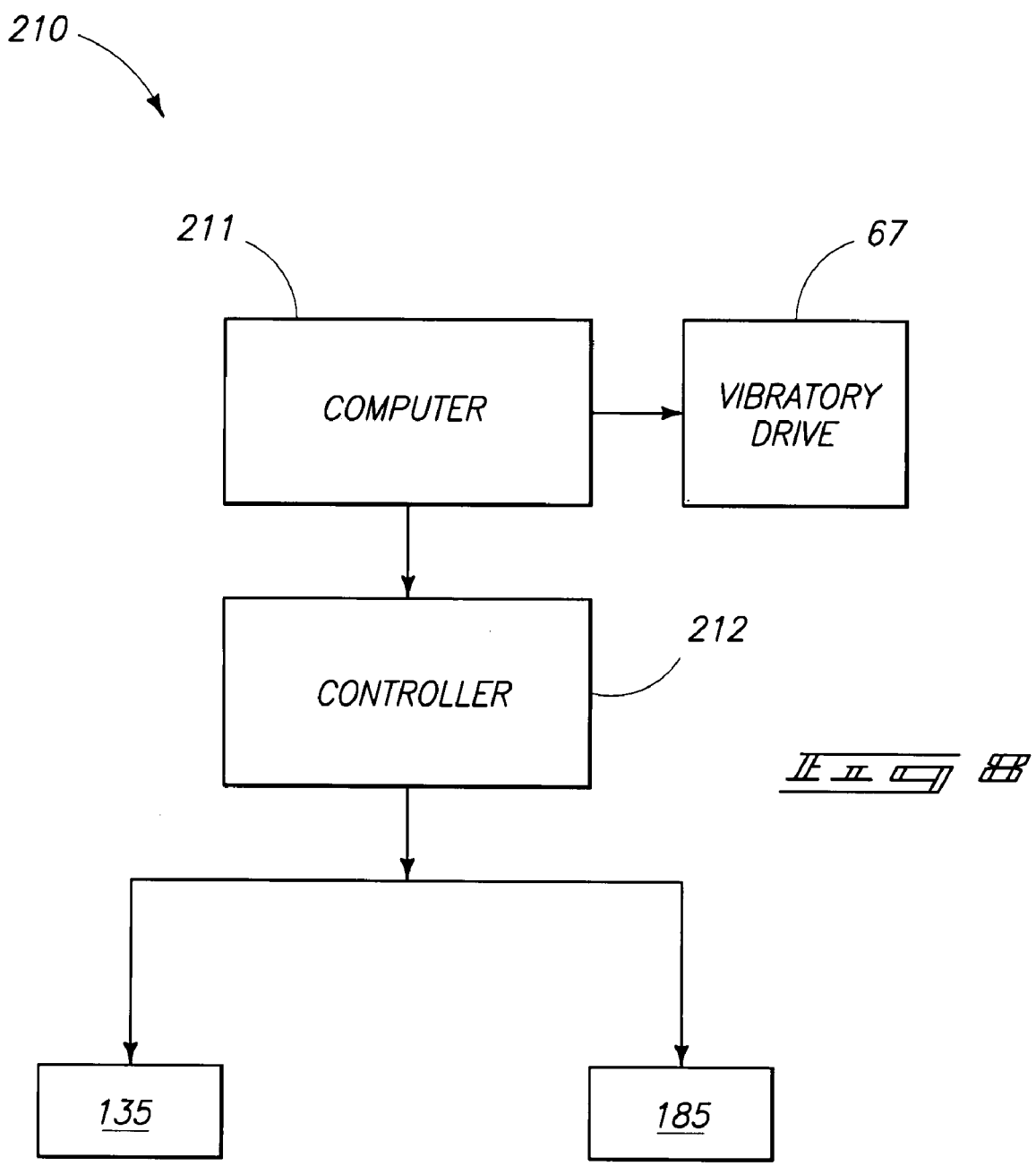

MANUFACTURING DEVICE FOR USE WITH A VIBRATORY CONVEYOR, AND METHOD FOR MANUFACTURING A PRODUCT

TECHNICAL FIELD

The present invention relates to a manufacturing device for use with a vibratory conveyor, and a method for manufacturing a product, and more specifically to a manufacturing device which has a moveable flexible substrate which is defined by first and second courses, and wherein the flexible substrate beneficially acts upon a product as the product moves along a course of travel.

BACKGROUND OF THE INVENTION

Excited frame vibratory conveying devices are well known in the art. For example, U.S. Pat. Nos. 4,313,535, and 6,276,518, both of which are incorporated by reference herein, shows typical excited frame or vibratory conveying apparatus designs. Such prior art devices as seen in U.S. Pat. No. 4,313,535 typically include a vibratory drive mounted on an elongated frame and which rests on a floor or other supporting structure. Extending upwardly from the frame and inclined in the direction of the intake or in feed of the conveyor are a plurality of leaf springs. An elongated conveyor or product transporting bed is mounted on the distal ends of each of the leaf springs and is supported by them in generally parallel relation relative to the frame and in a substantially overall horizontal orientation. Those skilled in the art will recognize that due to the resiliency of the respective leaf springs, the product conveying bed is capable of moving relative to the supporting frame in response to a force imported to the bed by a vibratory drive. During operation of an excited frame vibratory conveying device, the vibratory drive produces an oscillating vibratory force which is generated by counter rotating eccentric weights which are subcomponents of the vibratory drive. In view of the fact that the vibratory drive is mounted on the frame, it imparts vibratory motion to the frame which is then transferred to the overhead conveyor or product transporting bed. As a result, the conveyor bed vibrates at substantially the same frequency as the drive and frame.

As compared with other types of vibratory conveyors that are generally available, excited frame vibratory conveying devices impart less vibrational force to the floor or other supporting structure as the device is energized. This is due, in part, to the relatively lightweight of such devices and the small vibrational amplitude of the frame as compared to the vibrational amplitude of the product conveying bed. This low level of vibrational force transferred to the surrounding structure is a chief advantage of excited frame vibratory conveyors as seen in the prior art.

While vibratory conveyors of the type, noted above, have gained increasing acceptance and are widely used in many industry segments, developers and operators of such devices have sought means to make such excited frame conveyors as versatile as possible. For example, referring now to U.S. Pat. No. 6,460,680, an example of a diverter assembly which may be utilized in combination with a vibratory conveyor as described above is shown. The device as illustrated in this patent is useful for diverting products of various types along different courses of travel based upon the characteristics of the product being employed. In addition to the foregoing, other designs of vibratory conveyors have been developed which may be utilized with other processing machinery to widen the range of application and which these same conveyors may find usefulness. Such vibratory conveyors may have different drive assemblies which, for example, they may be electromagnetically driven as seen in U.S. Pat. No. 6,079,549, and which further impart reciprocal linear motion to a product transporting bed.

A manufacturing device for use with a vibratory conveyor having a product transporting bed similar to that described in the prior art is the subject matter of the present application.

SUMMARY OF THE INVENTION

A first aspect of the present invention relates to a manufacturing device for use with a vibratory conveyor having a product transporting bed and which includes a flexible substrate having a first upper course, and a second lower course which rests upon a product transporting bed of a vibratory conveyor, and wherein a product which is transported by the vibratory conveyor travels between the upper and lower courses of the flexible substrate as the product moves along the vibratory conveyor.

Another aspect of the present invention relates to a manufacturing device for use with a vibratory conveyor having a product transporting bed and which includes a supply of a flexible substrate positioned in selective, dispensing relation relative to the product transporting bed; a feeding assembly mounting the supply of the flexible substrate, and positioned adjacent to the product transporting bed and which further selectively supplies the flexible substrate to the product transporting bed, and wherein the product transporting bed has a first intake end, and a second exhaust end, and wherein the flexible substrate has a first course which extends from the feeding assembly to the second exhaust end of the product transporting bed, and a second course which extends from the second exhaust end of the product transporting bed in the direction of the first intake end of the product transporting bed, and wherein the second course rests upon the product transporting bed, and the first course is positioned above the second course; and a recovery assembly located adjacent the first intake end of the conveyor and which receives the supply of the flexible substrate, and wherein the vibratory conveyor, when energized, imparts motion to a product which is deposited at the intake end of the product transporting bed so as to move the product to the second exhaust end of the product transporting bed, and wherein the product when moving from the first intake end, to the second exhaust end travels between the first and second courses.

Still further, the present invention relates to a method for manufacturing a product which includes the steps of providing a vibratory conveyor having a product transporting bed; providing a flexible substrate having a first upper course and a second lower course which are positioned adjacent to each other, and resting the second course on the product transporting bed; depositing a product to be manufactured on the second course of the flexible substrate; and imparting vibratory motion to the product transporting bed so as to facilitate the movement of the product along the vibratory conveyor, and between the first and second courses of the flexible substrate.

Still further, another aspect of the present invention relates to a method for manufacturing a product which includes the steps of providing a vibratory conveyor having a substantially rigid product transporting bed with opposite first and second ends; providing a discharge chute near the second end of the product transporting bed; providing a source of a flexible substrate and periodically dispensing the flexible substrate upon the vibratory conveyor in a manner so as to provide a first course which extends from the source of the flexible substrate to the discharge chute, and a second course which extends from the discharge chute to the first end of the product transporting bed, and wherein the second course of the flexible substrate rests upon the product transporting bed, and the first course is positioned above and adjacent to the second course; depositing a product to be manufactured onto the first end of the product transporting bed; energizing the vibratory conveyor so as to impart movement of the product between the first and second ends of the product transporting bed, and between the adjacent first and second courses, and wherein the product is received in the discharge chute when the product reaches the second end of the product transporting bed; and providing a recovery device which is coupled to the second course and which is periodically activated so as to recover a given amount of the flexible material which has been previously oriented upon the product transporting bed.

These and other aspects of the present invention will be described in greater detail hereinafter.

BRIEF DESCRIPTION OF THE DRAWINGS

Preferred embodiments of the invention are described below with reference to the following accompanying drawings.

FIG. 8 is a greatly simplified, schematic diagram showing a control system which is a feature of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
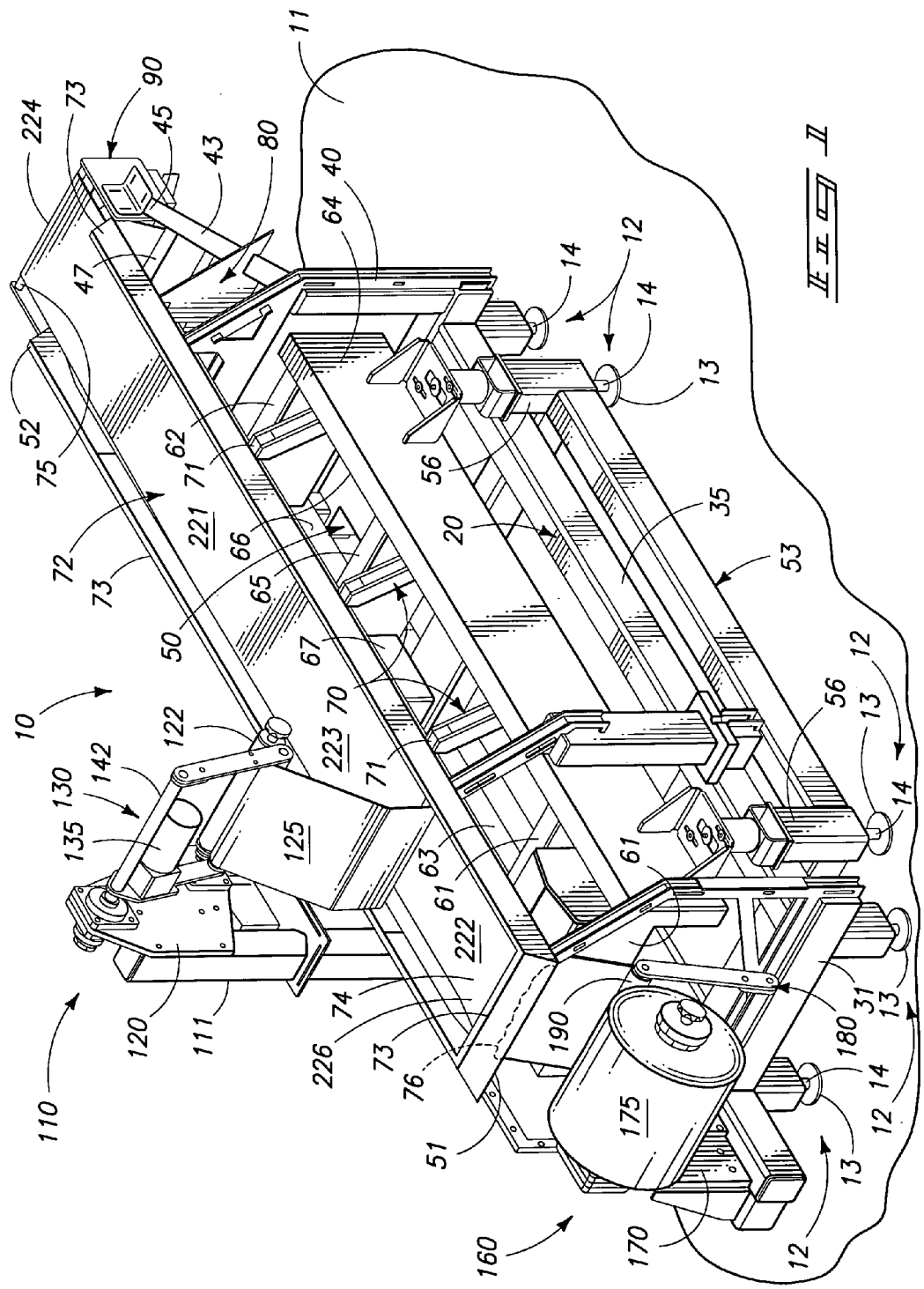
FIG. 1 is a perspective, side elevation view of a manufacturing device for use with a vibratory conveyor having the features of the present invention.
Figure 2:
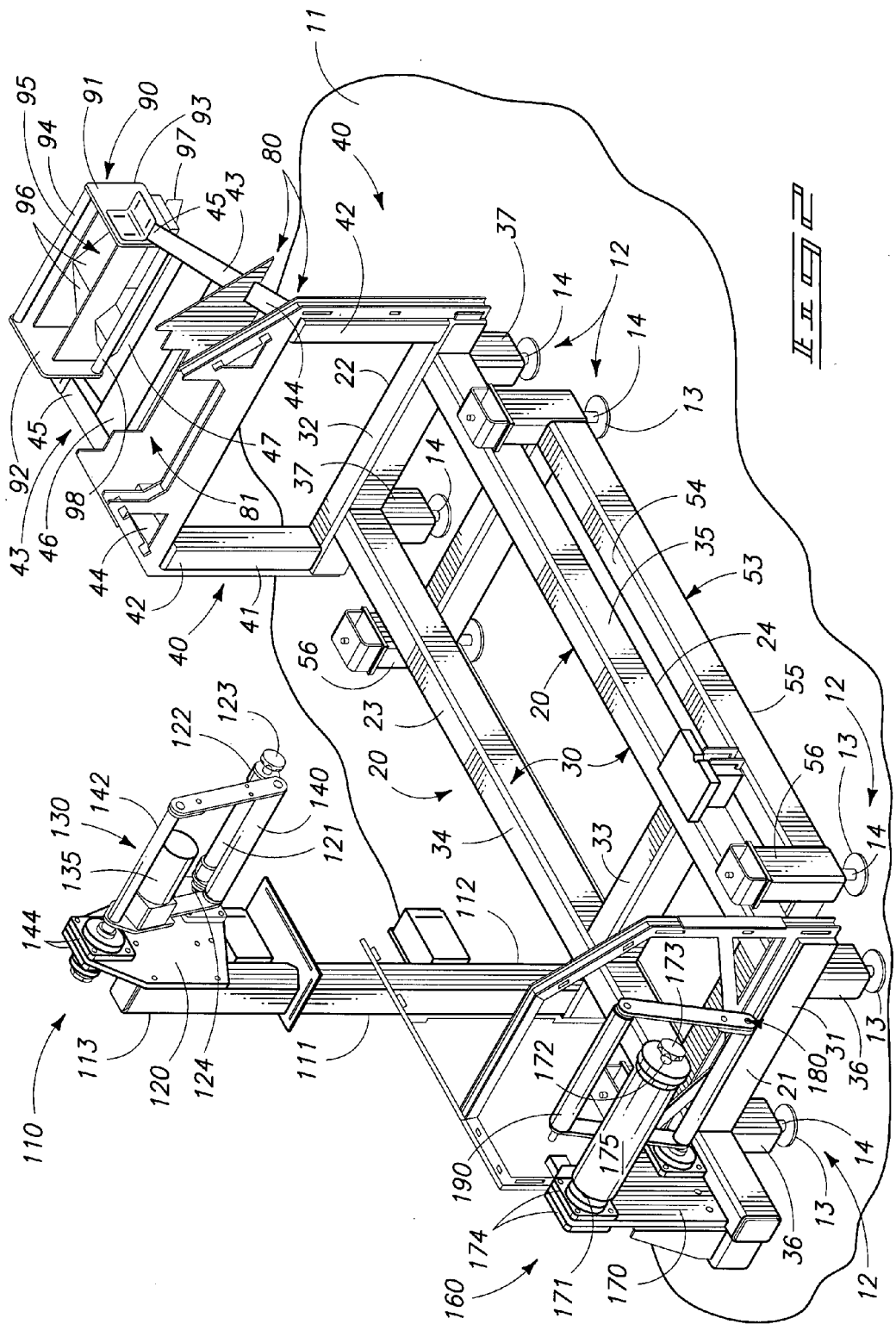
FIG. 2 is a perspective, fragmentary, side elevation view of several underlying frames which form a feature of the present invention.

Referring now to FIG. 1, one possible form of the present invention is generally indicated by the numeral 10 therein. As seen in that view, the present invention 10 is operably mounted in a location upon the surface of the earth, or other supporting surface such as a factory floor which is generally indicated by the numeral 11. A plurality of legs which are generally indicated by the numeral 12, support the invention 10 in spaced relation relative to the floor 11. In this regard, the plurality of legs each include a base member which is generally indicated by the numeral 13. Extending substantially normally upwardly relative thereto is a threaded shaft which is generally indicated by the numeral 14. The plurality of legs 13 are operable to screw threadably couple with a first frame which is generally indicated by the numeral 20 (FIG. 2). The first frame has a first end 21, and an opposite second end 22. Still further, the frame has a top surface 23, and an opposite bottom surface 24. As seen in FIG. 1 and following, the first frame 20 comprises a plurality of frame members 30. These frame members 30 include a first transverse frame number 31 positioned at the first end 21 of the frame 20, and an opposite second transverse frame number 32 positioned at the second end 22 of the first frame 20; a third transverse and intermediately positioned frame member 33 which is located between the first and second ends 21 and 22 of the first frame 20; a fourth longitudinally disposed frame member 34 which is coupled to each of the respective first, second and third frame members 31, 32 and 33, respectively, and an opposite, fifth, longitudinally disposed frame member 35 which similarly is coupled to the first, second and third transversely disposed frame members 31, 32 and 33. The respective frame members 31-35 are suitably coupled together by appropriate fasteners, welding, or the like, in order to provide a substantially rigid frame 20. This is best seen in FIG. 2. As seen further, in FIG. 2 it will be understood that the first frame 20 includes a first pair of shaft receiving members which are generally indicated by the numeral 36, and which are further mounted on the bottom surface 24 of the first frame member 31, and are further located near the first end 21 thereof. The first pair of shaft receiving members 36 extend substantially normally downwardly relative thereto and define a threaded channel (not shown) which is operable to threadably receive the individual shafts 14 of the respective legs 12 which are located most closely adjacent to the first end 21 of the frame 20. Located adjacent to the second end 22 of the frame 20 is a second pair of second shaft receiving members 37. Similarly, the second shaft receiving members 37 are mounted, by welding or the like, on the second end 22 of the frame 20, and further define a threaded passageway (not shown), and which are operable to individually receive the threaded shafts 14 of a pair of leg members 12 that support the first end 21 of the first frame 20 in spaced relation relative to the supporting surface 11. In this regard, it should be understood that the second shaft receiving members 37 act, in combination, as an angle adjustment assembly for the product transporting bed as will be described hereinafter. The angle adjustment assembly provides a convenient means whereby the second end 22 of the first frame member 20 can be adjusted into various angular positions relative to the supporting surface 11.

Still referring to FIG. 2, it will be seen that the first frame 20 includes a pair of vertically oriented frame members which are generally indicated by the numeral 40, and which are mounted on the top surface 23 thereof and which are located near the second end 22. The substantially vertically disposed frame members have a first end 41 which is connected by welding or the like to the top surface 23, and an opposite distal, second end 42 which is remote thereto. Still further, a pair of angulated support members are mounted to the distal ends 42 of the respective vertical frame members 40, and extend forwardly, and upwardly in angulated spaced relation relative thereto. The pair of support members 43 have a first end 44 which is connected by welding or the like to the respective vertical frame members 40, and an opposite second distal end 45. Still further, a transversely disposed reinforcement member which is generally indicated by the numeral 46 is positioned therebetween the respective angulated support members 43 and is spaced from the distal end 45 thereof. As seen in FIG. 1, a gap 47 is defined between the distal second ends 45 thereof and which will allow for the passage of a flexible substrate which will be discussed in greater detail hereinafter.

Still referring to FIG. 1, it will be seen that the present invention 10 includes a vibratory conveyor 50 which cooperates with the first frame 20 in order to provide the benefits of the present invention. The vibratory conveyor may be of the excited frame variety, as will be discussed hereinafter, or may be any vibratory conveyor similar to that seen in U.S. Pat. No. 6,276,518, or which further comprises any linear conveyor technology which produces reciprocal linear motion, and/or which are driven by mechanical or electromagnetic drives. The vibratory conveyor has a first end 51 which is located near the first end 21 of the first frame and an opposite second end 52 which is remote thereto. Still further, the vibratory conveyor is supported on the surface of the earth 11 by a second frame 53 which is positioned under or below the first frame 20 and which is supported on the underlying supporting surface 11. The second frame 53 has a top surface 54 which is disposed in spaced relationship relative to the bottom surface 24 of the first frame 20, and an opposite bottom surface 55 which is disposed in spaced relation relative to the supporting surface 11. Still further, the second or bottom frame 53 is supported on the surface 11 by a plurality of legs 56. In this regard, it should be understood that the legs 56 which are positioned at the second end 52 of the vibratory conveyor are adjustable thereby providing a means by which the vibratory conveyor 50 can be disposed in various angulated orientations relative to the supporting surface 11. More specifically, it has been discovered that it is advisable to position the vibratory conveyor 50, and in particular the second end thereof 52 at an elevated orientation relative to the first end 51 thereof for certain products such as pharmaceuticals. As seen in FIG. 1, the vibratory conveyor 50 is further formed of first and second transversely disposed frame members 61 and 62 which are located at the opposite first and second ends 51 and 52 thereof; and third and fourth longitudinally disposed frame members 63 and 64 which are connected by welding and the like to the first and second frame members 61 and 62. The first, second, third and fourth frame members 61-64, respectively, form a substantially rigid rectangular frame. This rigid frame is mounted upon the frame 53 as seen in FIG. 2. Still further, there is a plurality of intermediate transversely disposed frame members 65 which are affixed therebetween the third and fourth longitudinally disposed frame members 63 and 64 in order to strengthen the vibratory conveyor 50 and more specifically the second frame 53, thereof. Each of the third and fourth longitudinally disposed frame members 63 and 64 have an inside facing surface which is generally indicated by the numeral 66. A drive assembly 67, which is only partially shown in the drawings, is mounted on the second frame 53 and is operable to generate vibratory motion which excites the vibratory conveyor bed which is resiliently mounted thereon. This feature will be discussed in greater detail hereinafter.

Mounted on the inside facing surfaces 66 of the third and fourth longitudinally disposed frame members 63 and 64 thereof, is a plurality of spaced leaf springs which are generally indicated by the numeral 70. These leaf springs are well known in the art. These springs have a distal end 71 which moveably supports a rigid, product transporting bed which is indicated by the numeral 72. The product transporting bed 72 is narrowly rectangular in shape and has sidewalls 73 which extend normally, upwardly therefrom and which define a course of travel for a product to be inspected. In particular, the product transporting bed has a first intake end 74, and an opposite second exhaust end 75. As seen most clearly by reference to FIG. 1, a channel or passageway 76 is formed, in part, by the sidewall 73 which is located at the intake end 74. This channel or passageway permits or otherwise accommodates the passage of a flexible substrate which will be discussed in greater detail hereinafter. As earlier noted, the apparatus 10 is rendered operable so as to permit the adjustable positioning of the second exhaust end 75 of the product transporting bed 72 in a manner such that it is at a higher elevation relative to the first intake end 74 thereof. This feature will be discussed in greater detail below.

Similar to other excited bed conveyors in the art, energy imparted into the second frame 53 is operable to cause the plurality of leaf springs 70 to impart reciprocal motion to the product transporting bed 72 in an advantageous manner such that a product, as will be discussed hereinafter, and which is deposited at the first intake end 74 thereof may move steadily towards the second exhaust end 75. As best seen by reference to FIG. 2, a plurality of bed support members 80 are mounted on the pair of angulated support members 43 which extend outwardly relative to the vertical frame members 40. These plurality of bed support members 80 define individual channels 81 which substantially inhibits lateral movement of the second exhaust end 75 of the product transporting bed 72 as reciprocal motion is imparted to same.

Referring now to FIG. 2, mounted in gravity receiving relation relative to the second exhaust end 75 of the product transporting bed 72 is a discharge chute which is generally indicated by the numeral 90. The discharge chute 90 is mounted between the second ends 45 of the pair of angulated support members 43. The discharge chute 90 further has a main body 91 which has a first end 92, and an opposite, second end 93. Still further, the discharge chute 90 has a leading peripheral edge 94 which is operable to support or engage a flexible substrate as will be described in greater detail hereinafter. Still further, the main body 91 defines an internal cavity 95 which receives a product that is being manufactured. This is best illustrated by reference to FIG. 7. The main body 91 includes several internal product engaging surfaces 96 which are positioned within the internal cavity 95 and which direct a product along a course of travel so that it may be delivered onto an appropriately oriented discharge ramp 97. This is best seen by reference to FIG. 2. Any product being processed then exits the discharge chute 90 and may travel onto another work station for additional processing. The main body 91 has a trailing peripheral edge 98 which is also utilized to substantially direct or otherwise engage or orient a flexible substrate along a particular course of travel. As will be seen in FIG. 1, the discharge chute 90 is substantially enclosed between first and second courses of flexible substrate as will be described in greater detail below.

Referring now to FIGS. 1-4, the present invention 10 includes a feeding assembly which is generally indicated by the numeral 110, and which is positioned adjacent to the vibratory conveyor 50, and near the first intake end 74 thereof. More specifically, the feeding assembly 110 is supported above the product transporting bed 72, and near the first intake end 74 by means of a vertical support member 111 which is affixed by welding, fasteners, or like to the first frame 20 (FIG. 2). This attachment takes place along the longitudinally oriented frame member which is generally indicated by the numeral 34. The vertical support member 111 has a first end 112 which is affixed to the first frame 20, and an opposite, second, or distal end 113 which is remote thereto. As seen most clearly by references to FIGS. 3 and 4, the feeding assembly 110 includes a support plate 120 which is mounted on the second, or distal end 113. The support plate rotatably supports a first axel which is generally indicated by the numeral 121. The first axel has a distal end 122 which matingly cooperates with a clamping or axle engagement member which is generally indicated by the numeral 123. The first axel 121 is rotatably supported on the support plate 121 by opposite bearing assemblies 124 which are of conventional design. As best depicted by reference to FIG. 3, a roll of a substantially continuous flexible substrate 125 is releasably mounted on the first axel 121 by means of the clamping or axle engagement member 123. The function of the substantially continuous flexible substrate 125 will be discussed in greater detail below.

Figure 3:
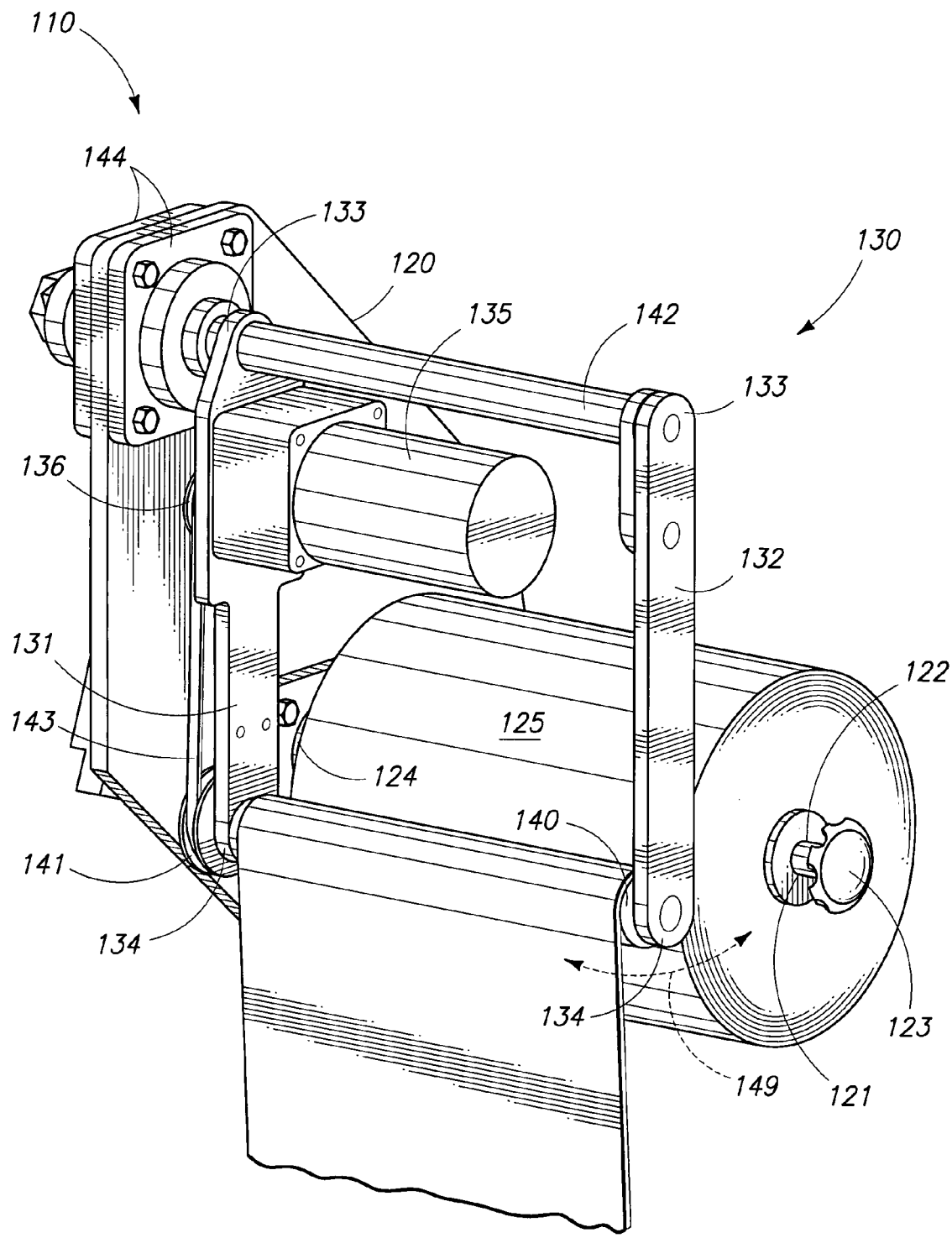
FIG. 3 is a perspective, fragmentary view of a feeding assembly which forms a feature of the present invention.
Figure 4:
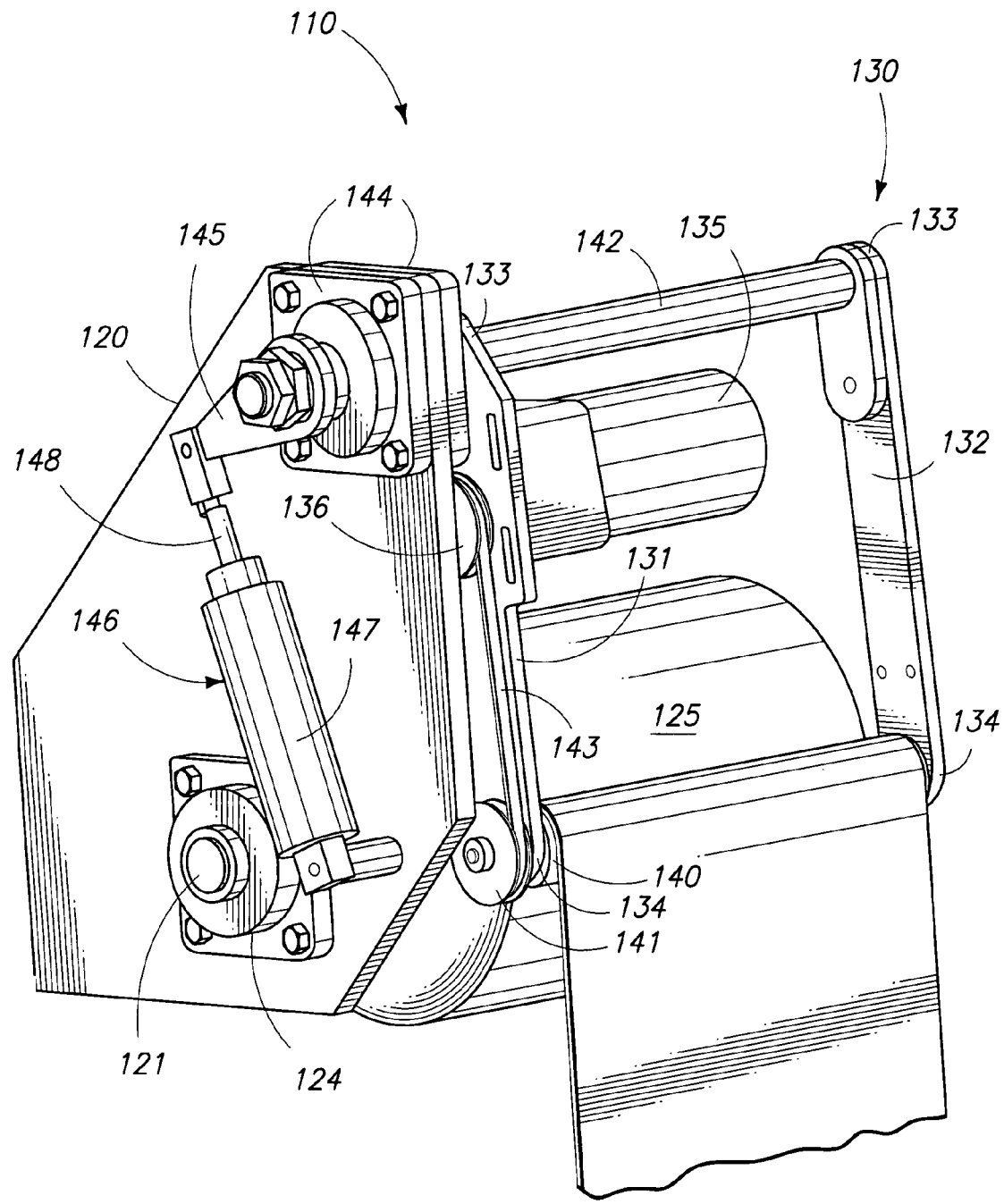
FIG. 4 is a second, perspective, fragmentary view of a feeding assembly which forms a feature of the present invention.

Referring now to FIGS. 3 and 4, respectively, it will be seen that the present invention 10 and more specifically the feeding assembly 110, thereof, includes a moveable or partially rotatable frame assembly 130 which operates, at least in part, as a tensioning device. The rotatable frame 130 includes a first frame member 131, and a second frame member 132 which are disposed in predetermined substantially parallel spaced relation relative thereto. The respective first and second frame members each have a first end 133, and an opposite second end 134. As seen by reference to FIG. 3, an electrically actuated motor 135 is mounted on the first frame member 131 and has a drive shaft which extends therethrough (not shown). A first drive gear, pulley or sprocket 136 is mounted on the distal end of the drive shaft. This is best seen by reference to FIG. 4. Mounted between the second ends 134 of the first and second frame members 131 and 132, respectively, is a drive roller which is generally indicated by the numeral 140 (FIG. 2). The drive roller when firmly pressed against the roll of the substantially continuous substrate 125, and when rotated, is operable to impart rotational movement to the roll of the substantially continuous flexible substrate 125 so as to dispense the flexible substrate from the roll for the purposes as discussed below. More specifically, it will be seen that the drive roller 140 is drivingly coupled to a second drive gear, pulley or sprocket 141 (FIG. 3) which is positioned on the second end 134 of the first frame member 131. As best illustrated in FIG. 3, the first and second frame members are rotatably mounted on a second axel 142 which is rotatably affixed to the support plate 120. Still further, by referring to FIG. 4, it will be seen that a drive chain or belt 143 is positioned thereabout the respective first 136 and second 141 drive gear, pulleys or sprockets such that upon energizing the motor 135, the motor 135 is operable to cause the corresponding drive roller 140 to rotate so as to dispense, in an appropriate fashion, the roll of the substantially continuous flexible substrate 125. Still further, it will be seen that the second axel 142 is rotatably borne by the support plate 120 by suitable bearing assemblies 144 as seen in both FIGS. 3 and 4, respectively. The present invention 10 also includes a drive member 145 which is rigidly affixed to one of the ends of the second axel 142. The distal end of the drive member is engaged by a pneumatic cylinder 146. The pneumatic cylinder is of conventional design, and has a cylinder body 147, and an extendable ram 148 which engages the drive member 145. Upon activating the pneumatic cylinder, the cylinder is operable to rotate the movable frame 130 in a fashion such that the drive roller 140 is firmly pressed against the roll of substantially continuous flexible substrate so as to impart rotational movement to same. The motor 135, and pneumatic cylinder, act in part, as a tensioning assembly or device for the roll of the flexible substrate 125. The pneumatic cylinder 146 is operable to move the rotatable frame 130 along an arcuately shaped path of travel which is generally indicated by the numeral 149 as seen in FIG. 3. The frame 130 can be moved away from the substantially continuous roll 125 to allow for the replacing of same.

Figure 5:
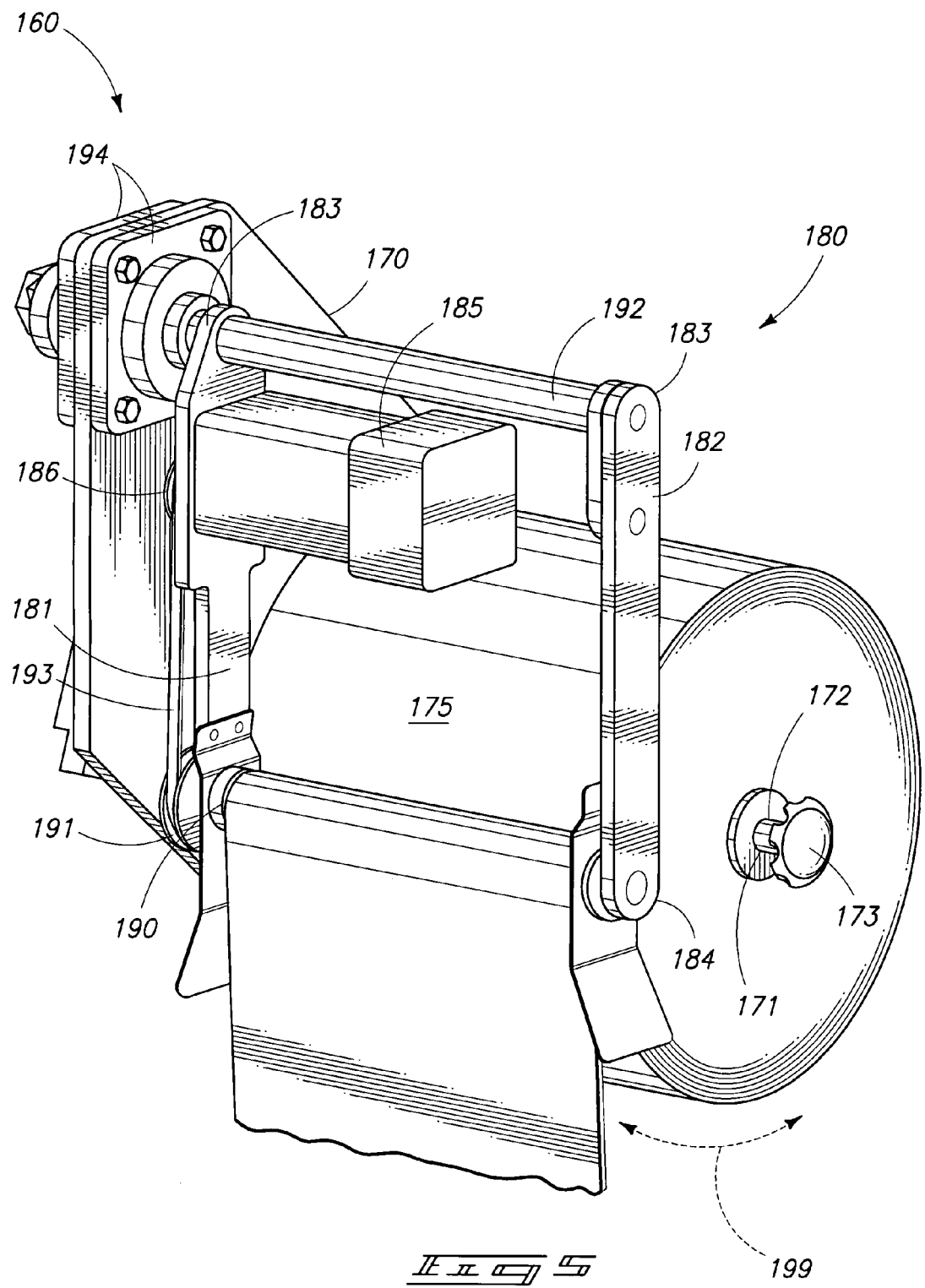
FIG. 5 is a perspective, side elevation view of a recovery assembly which forms a feature of the present invention.
Figure 6:
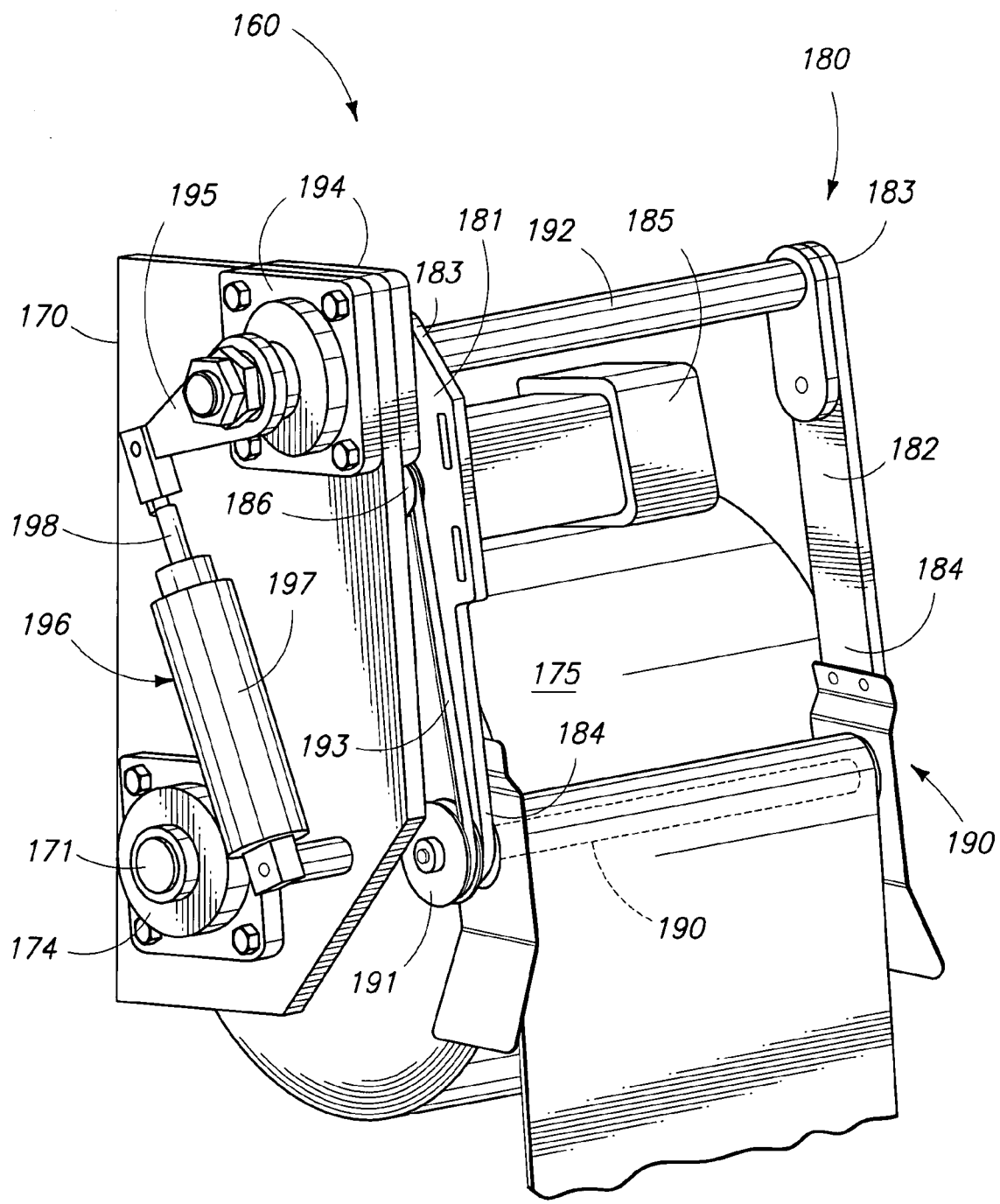
FIG. 6 is a second perspective, side elevation view of the same recovery assembly which forms a feature of the present invention.

Referring now to FIGS. 2, 5 and 6, it will be seen that the present invention 10 includes a recovery assembly which is generally indicated by the numeral 160. The recovery assembly 160 is positioned near the first end 21 of the first frame 20 and is operable to recover used continuous flexible substrate which has been previously utilized in connection with the present invention 10. More specifically, the recovery assembly 160 includes a support plate which is generally indicated by the numeral 170, and which is affixed by welding, or the like, to the first end 21 of the first frame 20 and more specifically on the top surface 23 of one of the longitudinally disposed frame members 34 (FIG. 2). The support frame 170 rotatably supports a first axel 171, which has a distal end 172. The distal end 172 is operable to matingly cooperate with a clamping or axle engagement member 173. Still further, the first axel 171 is rotatably supported on the support frame by a pair of bearings of traditional design 174 (FIG. 6). The bearings render the first axel 170 rotatable so as to support a take-up roll of used continuous flexible substrate which is generally indicated by the numeral 175.

The recovery assembly 160 further has a movable or partially rotatable frame that is generally indicated by the numeral 180 and which is best seen in FIGS. 5 and 6, respectively. The rotatable frame 180 has a first frame member 181, and a second frame member 182 and which are disposed in predetermined spaced substantially parallel relation one relative to the other. The first and second frame member each have a first end 183, and a second end 184. As illustrated most clearly by reference to FIG. 5, a torquing motor of conventional design is mounted on the first frame member 181, and is positioned between the first and second ends 183 and 184, respectively. The motor has a drive shaft (not shown) which extends through the first frame member 181. Mounted on the distal end of the drive shaft of the motor 185 is a first drive sprocket, gear or pulley 186. This is best seen in FIG. 6. Mounted between the second ends 184 of the first and second frame members 181 and 182, respectively, is a drive roller 190 which forcibly rotatably engages the take-up roll of used continuous flexible substrate 175 so as to impart rotational movement to same. The drive roller has a distal end which has mounted thereon a second drive sprocket, gear or pulley which is generally indicated by the numeral 191. The rotatable frame further includes a second axel 192 which extends between the first ends 183 of the first and second frame member 181 and 182, respectively. The second axel 192 is rotatably supported by the support plate 170 as will be discussed in greater detail hereinafter. Still further, a drive chain or belt 193 forcibly couples the first drive sprocket, gear or pulley 186 with the second drive sprocket, gear or pulley 195. This is best seen in FIG. 6. Therefore, when the motor 185 is energized, (which is usually substantially constantly) force from the motor 185 is transmitted through the drive chain or belt 193 so as to cause rotation of the drive roller 190. This facilitates, the rotation of the take-up roll 175 so as to recover flexible substrate previously dispensed by the feeding assembly 110. As will be seen by reference to FIG. 6, a drive member 195 is mounted endwardly of the second axel 192. The drive member provides a means by which rotational energy can be imparted into the second axel 192 thereby causing a corresponding rotation of the frame 180. This allows the drive roller 190 to be firmly pressed against the take up roll 175 so as to impart rotation to same. Further, mounted on the support frame 170 is a pneumatic cylinder 196 of conventional design. The pneumatic cylinder comprises, in part, a cylindrical body 197 which is mounted on the support plate 170 and which further has an extendible ram 198 which is affixed to the drive member 195. As illustrated most clearly by reference to FIG. 5, the motors 135 and 185 acting in combination comprise, at least in part, a tensioning assembly which is useful for the purposes which are described, below. Still further, the pneumatic cylinder 196, when activated, moves the rotatable frame 180 along an arcuately shaped path of travel 199 in order to facilitate, at least in part, the tensioning of the flexible substrate 175. As will be understood, the drive roller 190 can be moved out of engagement with the take-up roll 175 to allow the removal of same.

Figure 7:
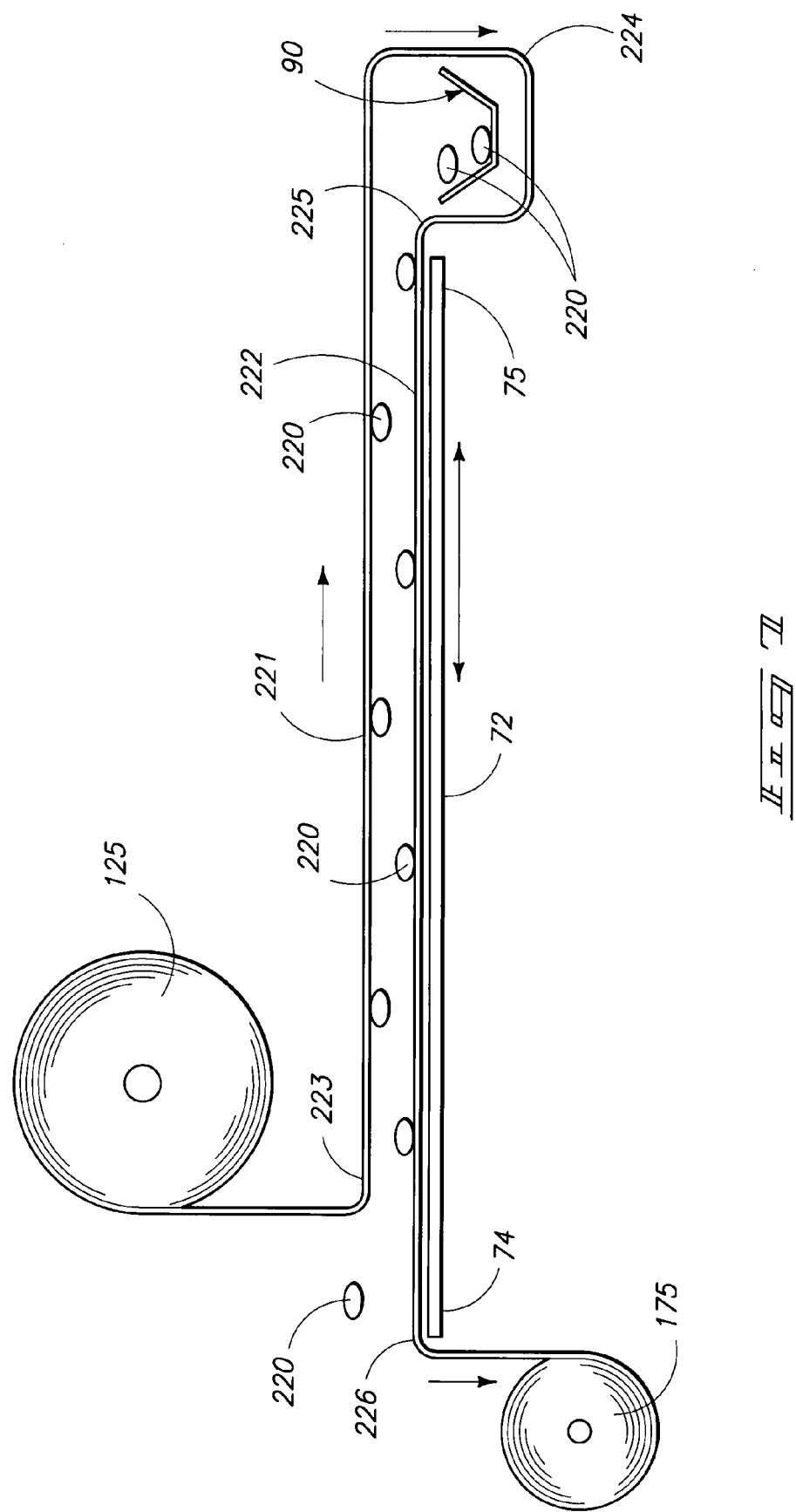
FIG. 7 is a greatly simplified, fragmentary, longitudinal, vertical sectional view of the conveyor bed which forms a feature of the present invention.

Referring now to FIG. 8, it will be seen that a control system 210 is provided and is operable to control the operation of the present invention 10. More specifically, the control system 210 includes a programmable computer 211 and which acts in combination with a controller 212 so as to control the energizing of the respective motors 135 and 185, respectively, as well as energize the vibratory drive which is shown, only in part, by the numeral 67. Referring now to FIG. 7, the manufacturing device and method for manufacturing a product of the present invention 10 is generally depicted therein. As should be understood, the roll of the substantially continuous flexible substrate 125 is selected so as to facilitate the removal, at least in part, of any unwanted substances from a product to be manufactured, and which is generally indicated by the numeral 220. As should be understood, the product to be manufactured comprises soft gel capsules or similar pharmaceuticals which may be ingested by an individual for various medicinal purposes. However, it will be recognized, that the present invention is not limited to the manufacture of soft gel capsules as disclosed herein, but may be employed with any product which has a material or substance which needs to be removed from the exterior surface of the product 220, at least in part, during a manufacturing process. As described herein, the substantially continuous flexible substrate 125 is an absorbent cloth or towel-like material which may be manufactured from both natural as well as synthetic fibers, but may comprise other materials based upon the product 220 which is being manufactured. In the arrangement as seen in FIG. 7, the product transporting bed 72, and which has a first end 74, and an opposite end 75, has vibratory motion imparted to same by means of the vibratory drive 67 that was earlier described and which is well known in the art. The product to be manufactured 220 is deposited at or near the first intake end 74 thereof and is operable to travel by means of the vibratory motion imparted into the product transporting bed 72 between a first course 221, and a second course 222, which rests thereon the product transporting bed 72. As illustrated, the first and second courses 221 and 222 are tensioned so as to be positioned in predetermined substantially parallel, spaced relation one relative to the other. Typically, the tensioning force for the respective first and second courses is imparted by the motor 185 which is substantially continuously energized while the motor 135 remains deenergized. Further, as the product to be manufactured 220 travels from the first intake end 74 to the second exhaust or discharge end 75, the product travels or otherwise moves into contact with both the first course 221 and the second course 222. This forcible contact with the first and second courses 221, and 222 has the effect of removing substances that were previously deposited on the product during earlier manufacturing steps, but which is now unwanted. In the arrangement as seen in FIG. 8, the first course 221 includes a first end 223 which is positioned near the first end 74 of the product transporting bed 72 and an opposite second end 224 which is positioned at or near the discharge chute 90. As illustrated in FIGS. 1 and 7, the first course 221 encloses, at least in part, the product discharge chute 90. Still further, the product discharge chute 90 provides a means for engaging and redirecting the first course into the second course 222. The second course 222 extends from the second end 75 of the product transporting bed 72 in the direction of the first end 74, thereof. As should be understood, the control system 210 is operable to periodically energize both of the respective motors 135 and 185, respectively, so as to cause the feeding assembly 110 and recovery assembly 160 to move the continuous flexible substrate 25 from the roll of substantially continuous flexible substrate 125 to the take-up roll 175 of the recovery assembly 160. This is done on a periodic basis based upon the amount of unwanted material or substances that has been removed from the product to be manufactured 220. This may be implemented by an operator (not shown), or it may be done automatically by means of the computer 211, based upon volume of product which has been processed by the manufacturing device 10.

Operation

The operation of the described embodiment of the present invention is believed to be readily apparent and is briefly summarized at this point.

In its broadest aspect, a manufacturing device 10 for use with a vibratory conveyor 50 having a product transporting bed 72 is best seen in FIG. 1 and following. In this regard the manufacturing device includes a flexible substrate 125 having a first upper course 221, and a second lower course 222 which rests upon a product transporting bed 72 of a vibratory conveyor 50. In the present invention, a product 220 which is transported by the vibratory conveyor 50 travels between the first upper course 221 and second lower course 222 of the flexible substrate 125 as the product moves along the vibratory conveyor. More specifically, the product transporting bed 72 has a first intake end 74 and a second exhaust end 75. The upper and lower courses 221 and 222 are positioned adjacent to each other. Still further, the product 220 traveling between the first and second courses 221 and 222 periodically contacts each of the first and second courses (FIG. 7). The manufacturing device 10 further includes a feeding assembly 110 positioned adjacent to the vibratory conveyor 50 and near the first intake end 74 thereof. A supply of the flexible substrate 125 is mounted on the feeding assembly 110. The upper course 221 of the flexible substrate 125 extends from the feeding assembly 110 in the direction of the second exhaust end 75 of the product transporting bed 72. Further, the lower course 222 extends from the second exhaust end 75 of the product transporting bed 72 in the direction of the first intake end thereof. The manufacturing device 10 of the present invention further includes a recovery assembly 160 which is positioned adjacent to the first intake end 74 of the product transporting bed 72. The recovery assembly receives the second course 222 of the flexible material 125. Still further, a pair of motors 135/185 are individually coupled in selective driving relation relative to the respective feeding assembly 110 and the recovery assembly 160. When energized simultaneously, the respective motors 135/185 facilitate the movement of the first and second courses 221 and 222, one relative to the other, and further when the motor 135 is deenergized, and the motor 185 is energized, acts, at least in part, as a tensioning assembly for the first and second courses 221 and 222. Still further, the manufacturing device 10 includes a controller 212 for periodically, selectively energizing the respective pair of motors 135/185 to either advance the flexible substrate or to tension the respective first and second courses. In addition to the foregoing, the manufacturing device 10 further includes a discharge chute 90 which is positioned adjacent, and in gravity receiving relation relative to the second exhaust end 75 of the product transporting bed 72. Still further, the discharge chute 90 is positioned during operation between the upper and lower courses 221 and 222 of the flexible substrate 125. In the arrangement as seen in the drawings (FIG. 7), the product 220 which is being transported by the product transporting bed 72 is received within the discharge chute 90 after traveling to the second exhaust end of the product transporting bed 72. As earlier discussed, the flexible substrate 125, in one form of the invention, may comprise an absorbent material. Still further and as seen by reference to FIG. 7, the upper and lower courses 221 and 222 are oriented in closely spaced relation one relative to the other. Still further, the manufacturing device 10 includes an assembly 37 which is mounted adjacent to the second exhaust end 75 of the product transporting bed 72 for adjusting the relative angle thereof.

More specifically, the manufacturing device 10 for use with a vibratory conveyor 50 having a product transporting bed 72 includes a supply of a flexible substrate 125 which is positioned in selective, dispensing relation relative to the product transporting bed 72; and a feeding assembly 110 mounting the supply of the flexible substrate 125. The feeding assembly 110 is positioned adjacent to the product transporting bed 72, and further selectively supplies the flexible substrate 125 to the product transporting bed 72. The product transporting bed has a first intake end 74, and a second exhaust end 75. The flexible substrate has a first course 221 which extends from the feeding assembly 110 to the second exhaust end 75 of the product transporting bed, and a second course 222 which extends from the second exhaust end of the product transporting bed 72 in the direction of the first intake end of the product transporting bed. In the arrangement as seen in the drawings, the second course 222 rests upon the product transporting bed 72, and the first course 221 is positioned above the second course.

Still further, the manufacturing device 10 includes a recovery assembly 160 which is located adjacent the first intake end 74 thereof, and which receives the supply of the flexible substrate 125. The vibratory conveyor 50, when energized, imparts motion to a product 220 which is deposited at the first intake end 74 of the product transporting bed so as to move the product to the second exhaust end of the product transporting bed. The product 220 which is moving from the first intake end 74, to the second exhaust end 75 travels between the first and second courses 221 and 222, respectively. As seen in the drawings, the feeding assembly 110 is mounted adjacent to the vibratory conveyer 50 and is positioned above the product transporting bed 72, and between the first intake end 74 and the second exhaust end 75 thereof. Still further, as seen in FIGS. 1 and 2, the recovery assembly 160 is mounted adjacent to the vibratory conveyor 50, and near the first intake end 74 thereof.

A discharge chute 90 is positioned adjacent to and in gravity receiving relation relative to the second exhaust end 75 of the product transporting bed 72, and between the first and second courses 221 and 222 of the flexible substrate 125. In the arrangement as seen, and as earlier discussed, the product 220 being transported by the product transporting bed 72 is received within the discharge chute 90 after traveling to the second exhaust end 75 of the product transporting bed 72. The flexible substrate 125 encloses, at least in part, the discharge chute, this is best illustrated by reference to FIG. 7. As earlier discussed, a tensioning device which is formed in part by the action of the respective motors 135/185 is provided and which forcibly engages the flexible substrate 125 so as to maintain the first and second courses 221 and 222 in closely spaced relation one relative to the other. This is typically achieved by deenergizing motor 135, and energizing motor 185 which maintains the proper tension on the flexible substrate 125. As seen by reference to FIG. 1, the product transporting bed 72 has a given width dimension, and wherein the width dimension of the flexible substrate 125 is greater than about 50% of the width dimension of the product transporting bed 72. As earlier discussed, and in one possible form of the invention, the flexible material or substrate 125 is absorbent, and the product 220 which is being transported by the product transporting bed 72 has an exterior surface which is covered, at least in part, by a substance which is removed by the flexible substrate. As presently conceived, the flexible substrate 125 may further operate to polish, at least in part, the product 220 which travels between the first and second courses 221 and 222, respectively.

The present invention also relates to a method for manufacturing a product 220 which broadly includes a first step of providing a vibratory conveyor 50 having a product transporting bed 72; and a second step of providing a flexible substrate 125 having a first upper course 221, and a second lower course 222 which are positioned adjacent to each other, and wherein the second lower course 222 rests upon the product transporting bed 72. The method of the present invention includes another step of depositing a product 220 to be manufactured on the second course 222 of the flexible substrate 125; and imparting vibratory motion to the product transporting bed 72 so as to facilitate the movement of the product 220 along the vibratory conveyor 50, and between the first and second courses 221 and 222 of the flexible substrate 125. In the methodology of the present invention, the vibratory conveyor 50 has a first intake end 74, and a second exhaust end 75, and the method further includes a step of providing a discharge chute 90, and positioning the discharge chute 90 in gravity receiving relation relative to the second exhaust end 75 of the product transporting bed 72, so as to receive the product 220 which travels to the second exhaust end 75 of the product transporting bed 72. In the methodology as provided above, the step of providing a flexible substrate 125 further comprises a step of engaging the flexible substrate 125 with the discharge chute 90 in a manner wherein the discharge chute is positioned, at least in part, between the first and second courses 221 and 222, respectively. Still further, the methodology includes a step of tensioning the first and second courses 221 and 222 so as position the first and second courses 221 and 222 in predetermined closely spaced relation one relative to the other. In the methodology as described above, the step of providing a flexible substrate 125 further comprises the steps of providing a substantially continuous supply of the flexible substrate 125; providing a feeding device 110 and mounting the substantially continuous supply of the flexible substrate 125 on the feeding device 110; providing a recovery device 160 which receives the substantially continuous supply of the flexible substrate 125; and activating the feeding and recovery devices 110 and 160 so as facilitate the movement of the first and second courses 221 and 222, one relative to the other. In the methodology as described above, the method further includes another step of adjusting the angle of product transporting bed 72 in order to facilitate the processing of the product 220. In the methodology as described above, the step of providing the feeding device 110 may further comprise mounting the feeding device 110 above the product transporting bed 72 and near a first intake end 74 of the product transporting bed 72. Still further, the step of providing the recovery device 160 further includes the step of mounting the feeding device near a first intake end 74 of the product transporting bed 72. Additionally, the steps of providing the feeding and recovery devices 110 and 160 further includes the step of controllably activating 212 the feeding and recovery devices 110 and 160 so as to control the amount of movement of the first and second courses 221 and 222 one relative to the other. Additionally, in the methodology as described above, the method includes the step of selecting a supply of the flexible substrate 125 which will remove, at least in part, an unwanted substance from the product 220 as the product moves between the first and second courses 221 and 222 of the flexible substrate 125.

More specifically, the methodology of manufacturing a product 220, includes the steps of providing a vibratory conveyor 50 having a substantially rigid product transporting bed 72 with opposite first and second ends 74 and 75, respectively. The method includes another step of providing a discharge chute 90 near the second end 75 of the product transporting bed 72; and providing a source of a flexible substrate 125 and periodically dispensing the flexible substrate 125 upon the vibratory conveyor 50 in a manner so as to provide a first course 221 which extends from the source of the flexible substrate 125 to the discharge chute 90, and a second course 222 which extends from the discharge chute 90 to the first end 74 of the product transporting bed 72. The second course 222 of the flexible substrate 125 rests upon the product transporting bed 72, and the first course 221 is positioned above and adjacent to the second course 222. The method includes another step of depositing a product 220 to be manufactured onto the first end 74 of the product transporting bed 72; and further energizing the vibratory conveyor 50 so as to impart movement of the product 220 between the first and second ends 74 and 75 of the product transporting bed, and between the adjacent first and second courses 221 and 222. The product 220 is received in the discharge chute 90 when the product reaches the second end 75 of the product transporting bed 72. The method includes a final step of providing a recovery device 160 which is coupled to the second course 222 and which is activated along with the feeding assembly 110 so as to recover a given amount of the flexible material 125 which has been previously oriented, or otherwise deployed in an operable orientation upon the product transporting bed 72. In the methodology as described above, the method includes another step of tensioning the first and second courses 221 and 222 so as to position the first and second courses in predetermined closely spaced relation one relative to the other. Still further, the method includes another step of adjusting the angle of elevation of the vibratory conveyor 50, and further selecting a source of the flexible material 125 which facilitates the removal, at least in part, of any unwanted substance from the product 220 as it moves between the first and second courses 220 and 221 of the flexible material 125.

Therefore, it will be seen that the present invention provides a convenient means whereby a product to be manufactured such as a soft gel capsule may be treated in a manner not possible heretofore thereby removing unwanted substances which may be deposited on the soft gel capsules during earlier manufacturing steps.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A manufacturing device for use with a vibratory conveyor having a product transporting bed, comprising:
    a flexible substrate having a first upper course, and a second lower course which rests upon a product transporting bed of a vibratory conveyor, and wherein a product which is transported by the vibratory conveyor travels between the upper and lower courses of the flexible substrate as the product moves along the vibratory conveyor, and wherein the product transporting bed has a first intake end and a second exhaust end, and wherein the upper and lower courses are positioned adjacent to each other, and wherein the product traveling between the first and second courses periodically contacts each of the first and second courses; and
    a feeding assembly positioned adjacent to the vibratory conveyor and near the first intake end thereof, and wherein a supply of the flexible substrate is mounted on the feeding assembly, and wherein the upper course of the flexible substrate extends from the feeding assembly in the direction of the second exhaust end of the product transporting bed, and wherein the lower course extends from the second exhaust end of the product transporting bed in the direction of the first intake end thereof.

2. A manufacturing device as claimed in claim 1, and further comprising:
    a recovery assembly positioned adjacent to the first intake end of the product transporting bed, and which receives the second course of the flexible material;
    a pair of motors individually coupled in selective driving relation relative to the respective feeding assembly and the recovery assembly, and which, when energized, facilitates the movement of the first and second courses, one relative to the other; and
    a controller for periodically, selectively energizing the respective pair of motors.

3. A manufacturing device as claimed in claim 1, and further comprising:
    a discharge chute positioned adjacent, and in gravity receiving relation relative to, the second exhaust end of the product transporting bed, and between the upper and lower courses of the flexible substrate, and wherein the product being transported by the product transporting bed is received within the discharge chute after traveling to the second exhaust end of the product transporting bed.

4. A manufacturing device as claimed in claim 1, and wherein the flexible substrate is an absorbent material.

5. A manufacturing device as claimed in claim 3, and wherein the upper and lower courses are oriented in closely spaced relation one relative to the other.

6. A manufacturing device as claimed in claim 5, and wherein a tensioning device is made integral with one of the feeding or recovery assemblies so as to maintain the upper and lower courses in spaced relation one relative to the other.

7. A manufacturing device as claimed in claim 1, and wherein the vibratory conveyor further comprises:
    a device mounted adjacent to the second exhaust end of the product transporting bed for adjusting the relative angle thereof.

8. A manufacturing device for use with a vibratory conveyor having a product transporting bed, comprising:
    a supply of a flexible substrate positioned in selective, dispensing relation relative to the product transporting bed;
    a feeding assembly mounting the supply of the flexible substrate, and positioned adjacent to the product transporting bed and which further selectively supplies the flexible substrate to the product transporting bed, and wherein the product transporting bed has a first intake end, and a second exhaust end, and wherein the flexible substrate has a first course which extends from the feeding assembly to the second exhaust end of the product transporting bed, and a second course which extends from the second exhaust end of the product transporting bed in the direction of the first intake end of the product transporting bed, and wherein the second course rests upon the product transporting bed, and the first course is positioned above the second course; and a recovery assembly located adjacent the first intake end of the conveyor and which receives the supply of the flexible substrate, and wherein the vibratory conveyor, when energized, imparts motion to a product which is deposited at the intake end of the product transporting bed so as to move the product to the second exhaust end of the product transporting bed, and wherein the product when moving from the first intake end, to the second exhaust end travels between the first and second courses.

9. A manufacturing device as claimed in claim 8, and wherein the feeding assembly is mounted adjacent to the vibratory conveyer and positioned above the product transporting bed, and between the first intake end and the second exhaust end thereof, and wherein the recovery assembly is mounted on the vibratory conveyor.

10. A manufacturing device as claimed in claim 8, and further comprising:

a discharge chute positioned adjacent to and in gravity receiving relation relative to the second exhaust end of the product transporting bed, and between the first and second courses of the flexible substrate, and wherein the product being transported by the product transporting bed is received within the discharge chute after traveling to the second exhaust end of the product transporting bed, and wherein the flexible substrate encloses, at least in part, the discharge chute.

11. A manufacturing device as claimed in claim 8, and further comprising:

a pair of motors individually coupled in selective driving relation relative to the respective feeding assembly and the recovery assembly, and which, when energized, facilitates the movement of the first and second courses, one relative to the other; and a controller for periodically selectively energizing the respective pair of motors.

12. A manufacturing device as claimed in claim 11, and wherein the controller selectively energizes the respective pair of motors for a time period which permits the replacement of the first and second courses of the flexible substrate.

13. A manufacturing device as claimed in claim 11, and wherein the pair of motors, working in combination, act as a tensioning device which forcibly engages the flexible substrate so as to maintain the first and second courses in closely spaced relation one relative to the other.

14. A manufacturing device as claimed in claim 8, and wherein the product transporting bed has a given width dimension, and wherein the width dimension of the flexible substrate is greater than about 50% of the width dimension of the product transporting bed.

15. A manufacturing device as claimed in claim 8, and wherein the flexible substrate is absorbent, and wherein the product which is being transported by the product transporting bed has an exterior surface which is covered, at least in part, by a substance which is removed by the flexible substrate.

16. A manufacturing device as claimed in claim 8, and wherein the flexible substrate operates to polish, at least in part, the product which travels between the first and second courses.

17. A manufacturing device as claimed in claim 8, and wherein the vibratory conveyor further comprises:

a device mounted adjacent to the second exhaust end of the product transporting bed for adjusting the relative angle thereof.

\* \* \* \* \*